W. R. CALVERT.
FISH TRAP.
APPLICATION FILED OCT. 13, 1911.
1,033,755.
Patented July 23, 1912.
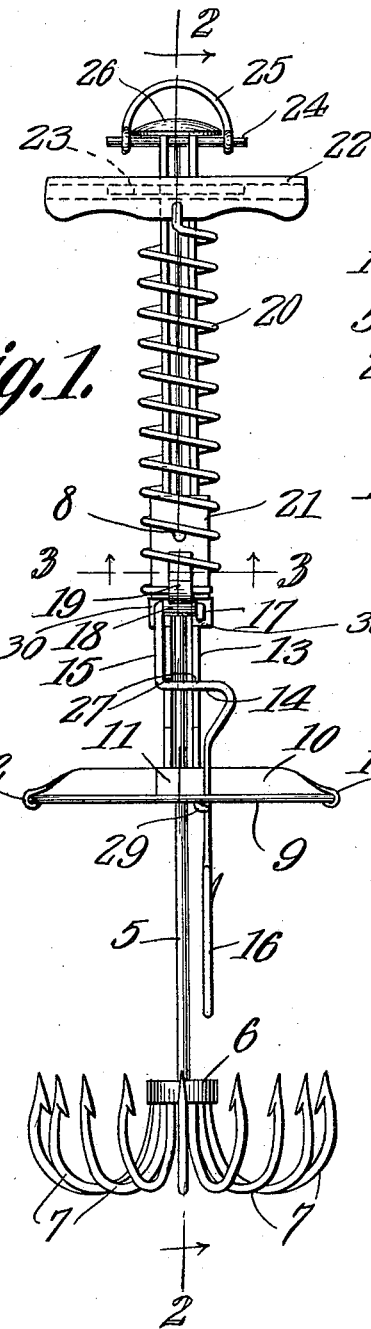
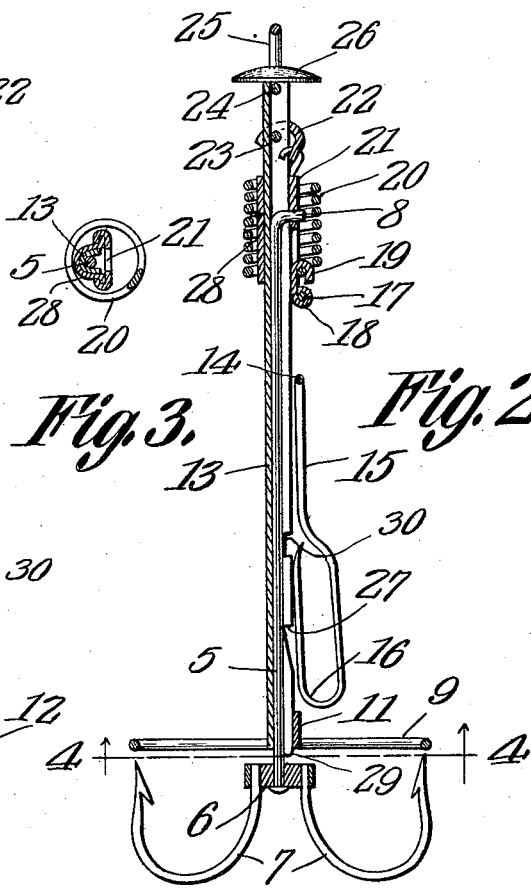
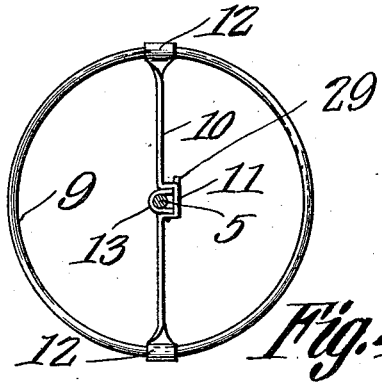
Witnesses
Walter R. Calvert, Inventor,
by C. A. Snow & Co.
Attorneys.

UNITED STATES PATENT OFFICE.

WALTER RILEY CALVERT, OF SAN ANTONIO, TEXAS.

FISH-TRAP.

1,033,755. Specification of Letters Patent. Patented July 23, 1912.

Application filed October 13, 1911. Serial No. 654,490.

*To all whom it may concern:*

Be it known that I, WALTER R. CALVERT, a citizen of the United States, residing at San Antonio, in the county of Bexar and State of Texas, have invented a new and useful Fish-Trap, of which the following is a specification.

This invention relates to traps, and is particularly adapted for trapping fish and other aquatic animals, and has for its object to provide an improved and efficient device of this character.

In its broad idea this invention contemplates the employment of two elongated members having a sliding engagement with each other, a trigger connected to one of the members and engageable with the other member, one or both of the said members having hooks or other means for snagging the fish or other animal, and a spring connected to one member and arranged to be manually brought under tension whereby upon the trigger being released the hooks or the like are caused to engage the animal.

In its specific embodiment this trap embodies an elongated body of U-shaped cross section having notches in the edges and in proximity to one end thereof, a strap secured over the edges of the said end of the body and having its ends extending radially in opposite directions from the body, a pin secured in proximity to the other end of the body, a button or head secured to the last mentioned end of the body, a ring secured to the ends of the said strap, a slide mounted on the body, a plunger fitting within the body and secured to the slide at its inner end and having the other end thereof protruding beyond the body, inwardly projecting hooks secured to the outer end of the said plunger, a trigger pivoted to the slide and adapted to engage the notches in the body to set the plunger in distended position, a coiled spring arranged on the body and secured to the said slide, and a hooked finger piece secured to the other end of the spring which is arranged to be engaged over the aforesaid pin against the tension of the spring.

This invention is illustrated in the accompanying drawings, wherein similar reference characters indicate similar parts, and wherein:—

Figure 1 is an elevation of the trap in set position. Fig. 2 is a longitudinal sectional view taken on the line 2—2 of Fig. 1, the plunger being shown in retracted position. Fig. 3 is a section on the line 3—3 of Fig. 1. Fig. 4 is a section on the line 4—4 of Fig. 2.

Referring specifically to the drawings, there is designated at 13 the elongated body of U-shaped cross section and at 5 the plunger which slidably fits within the said body having the outer end thereof protruding beyond the body. On the outer end of the plunger 5 is mounted a head 6 to which are secured the shanks of a plurality of radially disposed hooks 7 which have the pointed ends thereof projecting inwardly. A strap 10 has the intermediate portion 11 thereof secured over the edges of the end of the body 13, the said intermediate portion being of substantially U-shape and the ends of the said strap extend radially in opposite directions from the body and are twisted and bent around a ring 9 to secure the said ring to the ends of the said strap. The plunger 5 in sliding in the body 13 therefore causes the hooks 7 to move to and from the ring 19 and it will be seen that when the plunger is in extended or projected position and then retracted the hooks 7 will engage any object disposed between the said hooks and the ring 9, the ring 9 preventing the object from being displaced longitudinally upon the hooks 7 moving inwardly to assure the hooks engaging the object.

A slide is mounted to move longitudinally upon the body 13 and comprises a plate 21 bearing against the edges of the body 13 and a U-shaped or curved plate 28 passing around the body 13, the longitudinal edges of the plate 21 being bent or beaded around the longitudinal edges of the plate 28. The plunger 5 at its inner end is bent outwardly to form an angular projection 8 which pierces the plate 21 of the slide thus connecting the said plunger with the slide. A trigger 15 is pivoted to the slide, the said trigger being bent from a length of wire having the inner end thereof bent angularly as indicated at 17 around which end a lip 18 is bent from the plate 21 of the slide. This trigger 15 is hooked at its outer or free end as designated at 16 and intermediate its ends is provided with a double bend forming a transverse portion 14 adapted to engage the notches 27 in the edge of the body 5 at the outer end thereof in proximity to the strap 10.

Stops 30 are struck from the body 13 to limit the outward movement of the slide in bringing the same in position to be set, and an ear or projection 29 is struck from the outer end of the body for engaging over the hook of the trigger, as shown in Fig. 1 to assist in retaining the same in set position but permitting the trigger to be readily released.

To the other or inner end of the body 13 is secured the head or button 26 and next inside said button or head is secured a pin 24 around which the ends of a bail 25 are bent. A second pin 23 is secured to the body 17 in proximity to the head 26. A coiled wire spring 20 which is arranged on the body 13 is secured at its outer end to the slide by means of a lip 19 struck from the plate 21 and bent around the endmost convolution of the said spring, and to the other or inner end of the spring 20 is secured a hooked finger piece or plate 22.

In the use of the trap, the plunger 5 is slid outwardly in a projected position from the body 13 and the portion 14 of the trigger 15 is engaged with the pair of notches 27 in the body 13, thus setting the body 13 and the plunger 5 in a distended position with respect to each other and causing the hook 16 to be projected through the ring 9. The hook 16 of the trigger to which a suitable bait has been applied is therefore brought in a position between the hooks 7 of the plunger 5 and the ring 9 secured to the body 13. When the body and plunger are thus brought in position a tension is produced between the said body and dasher by pulling the inner end of the spring toward the head 26 and engaging the hooked plate 22 over the pin 23. The trap is then submerged in the water by means of a line connected to the bail 25, and upon a fish or other animal attempting to remove the bait from the trigger the trigger is released from the notches 27 thus causing the plunger 5 to be retracted by the tension of the spring 20 which pulls the slide inwardly, thus causing the hooks 7 to move toward the ring 9 and the body 13 to engage the fish or other animal. The ring 9 prevents the fish or other animal from being displaced upon the inward stroke of the plunger and therefore compels the hooks 7 to be firmly embedded into the body of the fish or other animal and retaining same until released by the trapper. In bringing the spring 20 under tension it is convenient to swing the bail 25 aside and then by placing the thumb upon the head 26, and engaging the first and second fingers over the finger piece 22, the finger piece may be conveniently drawn toward the said head and engaged over the pin 23. After the trap is sprung the finger piece 22 is disengaged from the pin 23 thus permitting the trap to be reset for a new operation. A trap constructed in accordance with the present invention is comparatively simple and compact in its construction, and is both efficient and convenient in its use. This trap is designed to catch the fish or other animals at any angle at which they may approach the bait, and it will be also noted that the ring 9 in addition to retaining the fish against longitudinal displacement upon the inward stroke of the dasher also serves to prevent the hooks from snagging or catching logs, brush and the like, thus acting as a guard.

Although this trap is particularly adapted for catching fish and other aquatic animals it may be found useful for catching certain land animals as will be apparent to those skilled in the art.

This trap is also designed to catch fish and other animals of various sizes, and it is understood that this trap may be constructed in various sizes and otherwise altered in its details of construction and arrangement of parts within the scope of the appended claims without departing from the spirit of the invention or sacrificing from the benefits derived.

What is claimed is:—

1. In a fish trap, an elongated body, a plunger having a sliding engagement therewith, a trigger connected to one of said parts and arranged to engage the other part to hold the parts in set position, and means for producing a tension between the body and plunger after they are set.

2. In a trap, an elongated body, a plunger having a sliding engagement therewith, a trigger connected to the plunger and adapted to engage the body to hold the plunger in projected position, forked elements secured to the plunger, and a spring adapted to be brought under tension between the body and plunger after the plunger is brought into projected position.

3. In a trap, an elongated body having notches therein, a plunger slidably engaged with the body and projectable beyond the end of the body, a slide mounted on the body and connected to the plunger, forked elements secured to the plunger, a trigger pivoted to the slide and adapted to engage the said notches to set the plunger in projected position, and means for producing a tension between the plunger and the body after they are set.

4. In a trap, an elongated body having notches therein, a plunger slidably engaged with the body and projectable beyond the end of the body, a slide mounted on the body and connected to the plunger, a trigger pivoted to the slide and adapted to engage the said notches to set the plunger in projected position to set the plunger and body relative to each other, and a spring for producing a tension between the body and the plunger when in set position.

5. In a trap, an elongated body having notches therein, a ring secured to one end of the body, a plunger slidably engaged with the body and projectable beyond the end of the body to which the ring is secured, a slide mounted on the body and connected to the plunger, inwardly projecting pointed members secured to the outer end of the plunger, a trigger pivoted to the slide and adapted to engage the said notches to set the plunger in projected position, and means for producing a tension between the body and plunger.

6. In a trap, an elongated body U-shaped in cross section having notches in the edges and in proximity to one end thereof, a strap secured over the edges of the said end of the body and having its ends extending radially in opposite directions from the body, a button secured to the other end of the body, a pin secured to the body in proximity to the said button, a ring secured to the ends of the said strap, a slide mounted on the body, a plunger fitting within the body and secured to the slide at its inner end and arranged to have the other end projected beyond the body, hooks secured to the outer end of the plunger, a trigger pivoted to the slide and adapted to engage the said notches in the body to set the plunger in projected position, a coiled spring arranged on the body and secured to the said slide, and a hooked finger piece secured to the spring which is arranged to be engaged over the aforesaid pin when the plunger is set in projected position to bring the said spring under tension.

In testimony that I claim the foregoing as my own, I have hereto affixed my signature in the presence of two witnesses.

WALTER RILEY CALVERT.

Witnesses:
 IDA L. RIEBE,
 JOHN F. DUNN.

---

Copies of this patent may be obtained for five cents each, by addressing the "Commissioner of Patents, Washington, D. C."